(12) United States Patent
Hawkins (10) Patent No.: US 11,298,640 B2
(45) Date of Patent: Apr. 12, 2022

(54) EXPANDABLE THREADED ADAPTOR FOR THREADLESS SHELL

(71) Applicant: Cummins Filtration IP, Inc., Columbus, IN (US)

(72) Inventor: Charles W. Hawkins, Sparta, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 16/478,092

(22) PCT Filed: Jan. 19, 2018

(86) PCT No.: PCT/US2018/014401
§ 371 (c)(1),
(2) Date: Jul. 15, 2019

(87) PCT Pub. No.: WO2018/140310
PCT Pub. Date: Aug. 2, 2018

(65) Prior Publication Data
US 2019/0366248 A1    Dec. 5, 2019

Related U.S. Application Data (60) Provisional application No. 62/450,263, filed on Jan. 25, 2017.

(51) Int. Cl.
*B01D 35/30* (2006.01)
*B01D 29/21* (2006.01)

(52) U.S. Cl.
CPC .......... *B01D 35/306* (2013.01); *B01D 29/21* (2013.01); *B01D 2201/295* (2013.01); *B01D 2201/342* (2013.01); *B01D 2201/4092* (2013.01)

(58) Field of Classification Search
CPC ................ B01D 35/306; B01D 29/21; B01D 2201/295; B01D 2201/342;
(Continued)

(56) References Cited

U.S. PATENT DOCUMENTS

| 2,025,009 A | 12/1935 | Baker |
| 2,093,877 A | 9/1937 | Von |

(Continued)

FOREIGN PATENT DOCUMENTS

| CN | 1130539 A | 9/1996 |
| CN | 1139884 A | 1/1997 |

(Continued)

OTHER PUBLICATIONS

International Preliminary Report on Patentability on PCT/US2018/014401 dated Jul. 30, 2019.
(Continued)

*Primary Examiner* — Madeline Gonzalez
(74) *Attorney, Agent, or Firm* — Foley & Lardner LLP (57) ABSTRACT

A filter assembly comprising a housing defining an internal volume. The housing comprises a first coupling member formed in a housing first end of the housing. The housing first end is threadless. The filter assembly further comprises a filter head. The filter head comprises a first thread formed on a surface thereof. The filter assembly further comprises an adapter. The adapter comprises a second coupling member formed on an adapter first end of the adapter. The second coupling member engages the first coupling member formed in the housing first end so as to removably couple the adapter and the housing. A second thread is formed on the adapter first end. The second thread engages the first thread formed in the filter head so as to removably couple the adapter and the filter head.

19 Claims, 4 Drawing Sheets

(58) Field of Classification Search
CPC ........... B01D 2201/4092; B01D 35/30; B01D 35/00; B01D 2201/29; B01D 2201/30; B01D 2201/301; B01D 2201/4061; B01D 2201/291; B01D 2201/304
USPC .................. 210/435, 440–443, 450, 451, 455
See application file for complete search history.

(56) References Cited

U.S. PATENT DOCUMENTS

| | | |
|---|---|---|
| 2,270,969 A | 1/1942 | Robinson |
| 2,306,325 A | 12/1942 | Sidney |
| 2,910,332 A | 10/1959 | Madsen |
| 2,915,188 A | 12/1959 | Buker |
| 2,955,028 A | 10/1960 | Bevans |
| 3,025,963 A | 3/1962 | Bauer |
| 3,224,592 A | 12/1965 | Burns |
| 3,383,841 A | 5/1968 | Olson |
| 3,494,113 A | 2/1970 | Corp |
| 3,576,095 A | 4/1971 | Rivers |
| 3,582,095 A | 6/1971 | Bogaert |
| 3,598,738 A | 8/1971 | Du Pont |
| 3,645,402 A | 2/1972 | Alexander et al. |
| 3,687,849 A | 8/1972 | Corp |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,128,251 A | 12/1978 | Gaither et al. |
| 4,129,429 A | 12/1978 | Humbert et al. |
| 4,144,169 A | 3/1979 | Grueschow |
| 4,181,313 A | 1/1980 | Hillier et al. |
| 4,211,543 A | 7/1980 | Tokar et al. |
| 4,257,890 A | 3/1981 | Hurner |
| 4,300,928 A | 11/1981 | Sugie |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,473,471 A | 9/1984 | Robichaud et al. |
| 4,572,522 A | 2/1986 | Smagatz |
| 4,589,983 A | 5/1986 | Wydevan |
| 4,600,420 A | 7/1986 | Wydeven et al. |
| 4,617,122 A | 10/1986 | Kruse et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,865,636 A | 9/1989 | Raber |
| 4,915,831 A | 4/1990 | Taylor |
| 4,925,561 A | 5/1990 | Ishii et al. |
| 4,951,834 A | 8/1990 | Aikins |
| 4,979,969 A | 12/1990 | Herding |
| 5,024,268 A | 6/1991 | Cheadle et al. |
| 5,050,549 A | 9/1991 | Sturmon |
| 5,069,799 A | 12/1991 | Brownawell et al. |
| 5,071,456 A | 12/1991 | Binder et al. |
| 5,094,745 A | 3/1992 | Reynolds |
| 5,120,334 A | 6/1992 | Cooper |
| 5,203,994 A | 4/1993 | Janik |
| 5,213,596 A | 5/1993 | Kume et al. |
| 5,222,488 A | 6/1993 | Forsgren |
| 5,223,011 A | 6/1993 | Hanni |
| 5,225,081 A | 7/1993 | Brownawell |
| 5,228,891 A | 7/1993 | Adiletta |
| 5,258,118 A | 11/1993 | Gouritin et al. |
| 5,298,160 A | 3/1994 | Ayers et al. |
| 5,302,284 A | 4/1994 | Zeiner et al. |
| 5,342,511 A | 8/1994 | Brown et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,484,466 A | 1/1996 | Brown et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda et al. |
| 5,556,542 A | 9/1996 | Berman et al. |
| 5,560,330 A | 10/1996 | Andress et al. |
| 5,562,825 A | 10/1996 | Yamada et al. |
| 5,569,311 A | 10/1996 | Oda et al. |
| 5,575,826 A | 11/1996 | Gillingham et al. |
| 5,591,330 A | 1/1997 | Lefebvre |
| 5,605,554 A | 2/1997 | Kennedy |
| 5,662,799 A | 9/1997 | Hudgens et al. |
| 5,672,399 A | 9/1997 | Kahlbaugh et al. |
| 5,709,722 A | 1/1998 | Nagai et al. |
| 5,720,790 A | 2/1998 | Kometani et al. |
| 5,738,785 A | 4/1998 | Brown et al. |
| 5,753,116 A | 5/1998 | Baumann et al. |
| 5,753,117 A | 5/1998 | Jiang |
| 5,759,217 A | 6/1998 | Joy |
| 5,772,883 A | 6/1998 | Rothman et al. |
| 5,793,566 A | 8/1998 | Scura et al. |
| 5,795,361 A | 8/1998 | Lanier et al. |
| 5,803,024 A | 9/1998 | Brown |
| 5,820,646 A | 10/1998 | Gillingham et al. |
| 5,830,371 A | 11/1998 | Smith et al. |
| 5,853,439 A | 12/1998 | Gieseke et al. |
| 5,863,424 A | 1/1999 | Lee |
| 5,891,402 A | 4/1999 | Sassa et al. |
| 5,893,939 A | 4/1999 | Rakocy et al. |
| 5,902,364 A | 5/1999 | Tokar et al. |
| 5,948,248 A | 9/1999 | Brown |
| 5,985,143 A | 11/1999 | Lin |
| 6,045,692 A | 4/2000 | Bilski et al. |
| D425,189 S | 5/2000 | Gillingham et al. |
| 6,086,763 A | 7/2000 | Baumann |
| 6,096,208 A | 8/2000 | Connelly et al. |
| 6,098,575 A | 8/2000 | Mulshine et al. |
| 6,099,612 A | 8/2000 | Bartos |
| 6,117,202 A | 9/2000 | Wetzel |
| 6,123,746 A | 9/2000 | Alvin et al. |
| 6,129,852 A | 10/2000 | Elliott et al. |
| 6,149,700 A | 11/2000 | Morgan et al. |
| 6,171,355 B1 | 1/2001 | Gieseke et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,217,627 B1 | 4/2001 | Vyskocil et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin et al. |
| 6,238,561 B1 | 5/2001 | Liu et al. |
| 6,261,334 B1 | 7/2001 | Morgan et al. |
| 6,264,831 B1 | 7/2001 | Hawkins et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,348,085 B1 | 2/2002 | Tokar et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,416,561 B1 | 7/2002 | Kallsen et al. |
| 6,447,566 B1 | 9/2002 | Rivera et al. |
| 6,475,379 B2 | 11/2002 | Jousset et al. |
| 6,478,018 B2 | 11/2002 | Fedorowicz et al. |
| 6,478,019 B2 | 11/2002 | Fedorowicz et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |

(56) References Cited

U.S. PATENT DOCUMENTS

| | | |
|---|---|---|
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,571,962 B2 | 6/2003 | Thomas |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,740,234 B1 | 5/2004 | Williams et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,823,996 B2 | 11/2004 | Durre |
| 6,827,750 B2 | 12/2004 | Drozd et al. |
| 6,835,304 B2 | 12/2004 | Jousset et al. |
| 6,837,920 B2 | 1/2005 | Gieseke et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,922,894 B2 | 8/2005 | Durre |
| 6,939,464 B1 | 9/2005 | Jiang et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 6,996,940 B2 | 2/2006 | Beasley |
| 6,998,045 B2 | 2/2006 | Durre |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,048,501 B2 | 5/2006 | Katayama et al. |
| 7,070,641 B1 | 7/2006 | Gunderson et al. |
| 7,081,145 B2 | 7/2006 | Gieseke et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke |
| 7,217,361 B2 | 5/2007 | Connor et al. |
| 7,237,682 B2 | 7/2007 | Reynolds et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,311,747 B2 | 12/2007 | Adamek et al. |
| 7,338,544 B2 | 3/2008 | Sporre et al. |
| 7,344,582 B2 | 3/2008 | Pearson et al. |
| 7,351,270 B2 | 4/2008 | Engelland et al. |
| 7,396,375 B2 | 7/2008 | Nepsund et al. |
| 7,425,226 B2 | 9/2008 | Powell |
| 7,491,254 B2 | 2/2009 | Krisko et al. |
| 7,494,017 B2 | 2/2009 | Miller |
| 7,524,416 B1 | 4/2009 | Bergmen |
| 7,540,895 B2 | 6/2009 | Furseth et al. |
| D600,790 S | 9/2009 | Nelson et al. |
| 7,582,130 B2 | 9/2009 | Ng et al. |
| 7,614,504 B2 | 11/2009 | South et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,662,216 B1 | 2/2010 | Terres et al. |
| 7,674,308 B2 | 3/2010 | Krisko et al. |
| 7,682,416 B2 | 3/2010 | Engelland et al. |
| 7,731,753 B2 | 6/2010 | Reo et al. |
| 7,776,139 B2 | 8/2010 | Schwandt et al. |
| 7,799,108 B2 | 9/2010 | Connor et al. |
| 7,828,869 B1 | 11/2010 | Parikh et al. |
| 7,882,961 B2 | 2/2011 | Menez et al. |
| 7,931,723 B2 | 4/2011 | Cuvelier |
| 7,959,714 B2 | 6/2011 | Smith et al. |
| 7,967,886 B2 | 6/2011 | Schrage et al. |
| 7,972,405 B2 | 7/2011 | Engelland et al. |
| 7,981,183 B2 | 7/2011 | Nepsund et al. |
| 7,993,422 B2 | 8/2011 | Krisko et al. |
| 8,016,903 B2 | 9/2011 | Nelson et al. |
| 8,034,145 B2 | 10/2011 | Boehrs et al. |
| 8,043,504 B2 | 10/2011 | Malgorn |
| 8,048,187 B2 | 11/2011 | Merritt et al. |
| 8,061,530 B2 | 11/2011 | Kindkeppel et al. |
| 8,062,399 B2 | 11/2011 | Nelson et al. |
| 8,096,423 B2 | 1/2012 | Menez et al. |
| 8,097,061 B2 | 1/2012 | Smith et al. |
| 8,101,003 B2 | 1/2012 | Krisko et al. |
| 8,119,002 B2 | 2/2012 | Schiavon et al. |
| 8,146,751 B2 | 4/2012 | Hawkins et al. |
| 8,167,966 B2 | 5/2012 | Amirkhanian et al. |
| 8,177,967 B2 | 5/2012 | Bagci et al. |
| 8,216,470 B2 | 7/2012 | Abdalla et al. |
| 8,220,640 B2 | 7/2012 | Schmitz et al. |
| 8,241,383 B2 | 8/2012 | Schrage et al. |
| 8,276,763 B2 | 10/2012 | Shaam |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,333,890 B2 | 12/2012 | Wells et al. |
| 8,348,064 B2 | 1/2013 | Tandon |
| 8,357,219 B2 | 1/2013 | Boehrs et al. |
| 8,419,938 B2 | 4/2013 | Ries et al. |
| 8,430,657 B2 | 4/2013 | Simonelli et al. |
| 8,440,081 B2 | 5/2013 | Wieczorek |
| 8,480,779 B2 | 7/2013 | Boehrs et al. |
| 8,496,723 B2 | 7/2013 | Reichter et al. |
| 8,501,001 B2 | 8/2013 | Curt et al. |
| 8,506,666 B2 | 8/2013 | Haslebacher |
| 8,518,141 B2 | 8/2013 | Schrage et al. |
| 8,544,158 B2 | 10/2013 | Curt et al. |
| 8,550,656 B2 | 10/2013 | Mccarthy et al. |
| 8,562,707 B2 | 10/2013 | Nepsund et al. |
| 8,636,820 B2 | 1/2014 | Reichter et al. |
| 8,652,228 B2 | 2/2014 | Krisko et al. |
| 8,709,119 B2 | 4/2014 | Reichter et al. |
| 8,714,565 B1 | 5/2014 | Cornett et al. |
| 8,753,414 B2 | 6/2014 | Gebert |
| 8,778,043 B2 | 7/2014 | Krisko et al. |
| 8,840,699 B2 | 9/2014 | Bruce et al. |
| 8,845,897 B2 | 9/2014 | Wieczorek et al. |
| 8,852,308 B2 | 10/2014 | Jarrier |
| 8,906,128 B2 | 12/2014 | Reichter et al. |
| 8,911,498 B2 | 12/2014 | Bartish et al. |
| 8,926,725 B2 | 1/2015 | Loken et al. |
| 8,932,465 B2 | 1/2015 | Wells et al. |
| 9,101,883 B2 | 8/2015 | Pugh et al. |
| 9,114,346 B2 | 8/2015 | Schrage et al. |
| 9,211,488 B2 | 12/2015 | South et al. |
| 9,308,476 B2 | 4/2016 | Martin et al. |
| 9,320,997 B2 | 4/2016 | Campbell et al. |
| 9,409,107 B2 | 8/2016 | Arakeri et al. |
| 9,415,333 B2 | 8/2016 | Kindkeppel et al. |
| 9,782,706 B1 | 10/2017 | Levy |
| 9,782,708 B2 | 10/2017 | Kindkeppel et al. |
| 10,729,999 B2 | 8/2020 | Nichols et al. |
| 10,744,443 B2 | 8/2020 | Silvestro |
| 10,835,852 B2 | 11/2020 | Decoster et al. |
| 2001/0032545 A1 | 10/2001 | Goto et al. |
| 2002/0046556 A1 | 4/2002 | Reid |
| 2002/0060178 A1 | 5/2002 | Tsabari |
| 2002/0073850 A1 | 6/2002 | Tokar et al. |
| 2002/0096247 A1 | 7/2002 | Wydeven |
| 2002/0157359 A1 | 10/2002 | Stenersen et al. |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0184025 A1 | 10/2003 | Matsuki |

(56) References Cited

U.S. PATENT DOCUMENTS

| | | |
|---|---|---|
| 2003/0218150 A1 | 11/2003 | Blakemore et al. |
| 2004/0035097 A1 | 2/2004 | Schlensker et al. |
| 2004/0040271 A1 | 3/2004 | Kopec et al. |
| 2004/0060861 A1 | 4/2004 | Winter et al. |
| 2004/0091652 A1 | 5/2004 | Kikuchi et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0024061 A1 | 2/2005 | Cox et al. |
| 2005/0166561 A1 | 8/2005 | Schrage et al. |
| 2005/0173325 A1 | 8/2005 | Klein et al. |
| 2005/0178714 A1* | 8/2005 | Stockbower ......... B01D 29/114 210/437 |
| 2005/0193695 A1 | 9/2005 | Holmes et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0064956 A1 | 3/2006 | Connor et al. |
| 2006/0113233 A1 | 6/2006 | Merritt et al. |
| 2006/0118474 A1 | 6/2006 | Kolczyk et al. |
| 2006/0180537 A1 | 8/2006 | Loftis et al. |
| 2006/0213139 A1 | 9/2006 | Stramandinoli |
| 2007/0037428 A1 | 2/2007 | Annecke |
| 2007/0095744 A1 | 5/2007 | Bagci et al. |
| 2007/0175815 A1 | 8/2007 | Thomas |
| 2007/0240392 A1 | 10/2007 | Ng et al. |
| 2007/0261374 A1 | 11/2007 | Nelson et al. |
| 2007/0267338 A1 | 11/2007 | Menez et al. |
| 2008/0011672 A1 | 1/2008 | Schwartz et al. |
| 2008/0022641 A1 | 1/2008 | Engelland et al. |
| 2008/0035587 A1 | 2/2008 | Wieczorek et al. |
| 2008/0047132 A1 | 2/2008 | Wieczorek |
| 2008/0087589 A1 | 4/2008 | Grzonka et al. |
| 2008/0107765 A1 | 5/2008 | Considine et al. |
| 2008/0110142 A1 | 5/2008 | Nelson et al. |
| 2008/0179263 A1 | 7/2008 | Wieczorek et al. |
| 2008/0237113 A1 | 10/2008 | Jensen |
| 2008/0250766 A1 | 10/2008 | Schrage et al. |
| 2008/0307759 A1 | 12/2008 | Reichter et al. |
| 2008/0308481 A1 | 12/2008 | Wieczorek et al. |
| 2009/0014381 A1 | 1/2009 | South et al. |
| 2009/0026124 A1 | 1/2009 | Schmitz et al. |
| 2009/0050554 A1 | 2/2009 | Shaam |
| 2009/0057213 A1 | 3/2009 | Schiavon et al. |
| 2009/0057219 A1 | 3/2009 | Bagci et al. |
| 2009/0064646 A1 | 3/2009 | Reichter et al. |
| 2009/0071892 A1 | 3/2009 | Malgorn |
| 2009/0090669 A1 | 4/2009 | Holzmann et al. |
| 2009/0095669 A1 | 4/2009 | South |
| 2009/0126324 A1 | 5/2009 | Smith et al. |
| 2009/0135590 A1 | 5/2009 | Mccarthy et al. |
| 2009/0151311 A1 | 6/2009 | Reichter et al. |
| 2009/0193972 A1 | 8/2009 | Schwandt et al. |
| 2009/0241315 A1 | 10/2009 | Menez et al. |
| 2009/0242475 A2 | 10/2009 | Menez et al. |
| 2009/0249754 A1 | 10/2009 | Amirkhanian et al. |
| 2009/0326657 A1 | 12/2009 | Grinberg et al. |
| 2010/0001477 A1 | 1/2010 | Eyers et al. |
| 2010/0043366 A1 | 2/2010 | Boehrs et al. |
| 2010/0051528 A1 | 3/2010 | Derstler et al. |
| 2010/0064646 A1 | 3/2010 | Smith et al. |
| 2010/0065203 A1 | 3/2010 | Tanbour et al. |
| 2010/0077710 A1 | 4/2010 | Severance et al. |
| 2010/0101993 A1 | 4/2010 | Wells et al. |
| 2010/0108590 A1 | 5/2010 | Curt et al. |
| 2010/0114318 A1 | 5/2010 | Gittings et al. |
| 2010/0126919 A1 | 5/2010 | Hawkins et al. |
| 2010/0150764 A1 | 6/2010 | Simonelli et al. |
| 2010/0170209 A1 | 7/2010 | Nelson et al. |
| 2010/0176047 A1 | 7/2010 | Bagci et al. |
| 2010/0186353 A1 | 7/2010 | Ackermann et al. |
| 2010/0200490 A1 | 8/2010 | Martin et al. |
| 2010/0258493 A1 | 10/2010 | Kindkeppel et al. |
| 2010/0263339 A1 | 10/2010 | Steins et al. |
| 2010/0294707 A1 | 11/2010 | Abdalla et al. |
| 2010/0294712 A1 | 11/2010 | Abdalla et al. |
| 2011/0089104 A1 | 4/2011 | Menez et al. |
| 2011/0132829 A1* | 6/2011 | Tucker ................ B01D 35/153 210/232 |
| 2011/0197556 A1 | 8/2011 | Brown et al. |
| 2011/0203099 A1 | 8/2011 | Curt et al. |
| 2011/0260413 A1 | 10/2011 | Voltenburg et al. |
| 2011/0303604 A1* | 12/2011 | McKenzie ............ B01D 35/30 210/350 |
| 2012/0031059 A1 | 2/2012 | Haslebacher |
| 2012/0055127 A1 | 3/2012 | Holzmann et al. |
| 2012/0061307 A1 | 3/2012 | Kindkeppel et al. |
| 2012/0223008 A1 | 9/2012 | Mbadinga-Mouanda et al. |
| 2013/0015119 A1 | 1/2013 | Pugh et al. |
| 2013/0087497 A1 | 4/2013 | Wells et al. |
| 2013/0220914 A1 | 8/2013 | Hawkins et al. |
| 2013/0291502 A1 | 11/2013 | Gorman |
| 2013/0327696 A1 | 12/2013 | Bagci et al. |
| 2014/0027366 A1 | 1/2014 | Hawkins et al. |
| 2014/0034565 A1 | 2/2014 | Loken et al. |
| 2014/0034566 A1 | 2/2014 | Verdegan et al. |
| 2014/0048468 A1 | 2/2014 | Kindkeppel et al. |
| 2014/0071669 A1 | 3/2014 | Mccarthy et al. |
| 2014/0096493 A1 | 4/2014 | Kelmartin et al. |
| 2014/0151275 A1 | 6/2014 | Bradford et al. |
| 2014/0190880 A1 | 7/2014 | Krull |
| 2014/0251895 A1 | 9/2014 | Wagner |
| 2014/0260143 A1 | 9/2014 | Kaiser |
| 2014/0290194 A1 | 10/2014 | Muenkel et al. |
| 2014/0318090 A1 | 10/2014 | Rieger et al. |
| 2015/0013289 A1 | 1/2015 | Hasenfratz et al. |
| 2015/0013293 A1 | 1/2015 | Wagner et al. |
| 2015/0033684 A1 | 2/2015 | Pettersson |
| 2015/0060351 A1 | 3/2015 | Kaufmann et al. |
| 2015/0061307 A1 | 3/2015 | Nakanishi |
| 2015/0090651 A1* | 4/2015 | Kotale .................. B01D 35/30 210/232 |
| 2015/0096273 A1 | 4/2015 | Kaiser |
| 2015/0096932 A1 | 4/2015 | Hou et al. |
| 2015/0176544 A1 | 6/2015 | Kaufmann et al. |
| 2015/0202556 A1 | 7/2015 | Hawkins et al. |
| 2015/0231532 A1 | 8/2015 | Pugh et al. |
| 2015/0285381 A1 | 10/2015 | Preston et al. |
| 2016/0023142 A1 | 1/2016 | Arakeri et al. |
| 2016/0045848 A1 | 2/2016 | Campbell et al. |
| 2016/0059172 A1 | 3/2016 | Allott et al. |
| 2016/0082372 A1 | 3/2016 | South et al. |
| 2016/0160816 A1 | 6/2016 | Venkatraman et al. |
| 2016/0169391 A1 | 6/2016 | Emig et al. |
| 2016/0222931 A1 | 8/2016 | Jiang et al. |
| 2016/0228798 A1 | 8/2016 | Page et al. |
| 2016/0258397 A1 | 9/2016 | Jiang et al. |
| 2016/0332103 A1 | 11/2016 | Marks et al. |
| 2017/0078852 A1 | 3/2017 | Tan et al. |
| 2018/0318745 A1 | 11/2018 | Nichols et al. |
| 2020/0324237 A1 | 10/2020 | Moers et al. |

FOREIGN PATENT DOCUMENTS

| | | |
|---|---|---|
| CN | 1193288 A | 9/1998 |
| CN | 2296402 Y | 11/1998 |
| CN | 1486213 A | 3/2004 |
| CN | 1590746 B | 3/2005 |
| CN | 2372041 Y | 4/2005 |
| CN | 1754612 A | 4/2006 |
| CN | 101084050 A | 12/2007 |
| CN | 101374582 A | 2/2009 |
| CN | 201292900 Y | 8/2009 |
| CN | 101695616 | 4/2010 |
| CN | 201696412 U | 1/2011 |
| CN | 102083510 A | 6/2011 |
| CN | 102271780 A | 12/2011 |
| CN | 202746046 | 2/2013 |
| CN | 103977647 A | 8/2014 |
| CN | 104220142 | 12/2014 |

(56) References Cited

FOREIGN PATENT DOCUMENTS

| | | |
|---|---|---|
| CN | 105688498 A | 6/2016 |
| CN | 106102858 A | 11/2016 |
| CN | 202040173 U | 11/2020 |
| DE | 88 08 632 U1 | 9/1988 |
| DE | 29613098 U1 | 9/1996 |
| DE | 10 2008 062 956 A1 | 6/2010 |
| EP | 0 718 021 A1 | 6/1996 |
| EP | 0 747 579 A2 | 12/1996 |
| EP | 0 982 062 A2 | 3/2000 |
| EP | 1 129 760 A2 | 9/2001 |
| EP | 1 166 843 A1 | 1/2002 |
| EP | 1 208 902 A1 | 5/2002 |
| EP | 1 233 173 A2 | 8/2002 |
| EP | 1 693 096 A2 | 8/2006 |
| EP | 1 693 096 B1 | 8/2006 |
| EP | 1 747 053 A1 | 1/2007 |
| EP | 3 370 849 A1 | 9/2018 |
| FR | 2214505 A1 | 8/1974 |
| GB | 0 970 826 A | 9/1964 |
| GB | 2 082 932 A | 3/1982 |
| GB | 2 404 348 A | 2/2005 |
| JP | 60-112320 A | 6/1985 |
| JP | 01-163408 A | 6/1989 |
| JP | 01-171615 A | 7/1989 |
| JP | 02-025009 A | 1/1990 |
| WO | WO-00/50152 A1 | 8/2000 |
| WO | WO-00/74818 A1 | 12/2000 |
| WO | WO-01/05485 A1 | 1/2001 |
| WO | WO-2004/054684 A1 | 7/2004 |
| WO | WO-2005/058461 A1 | 6/2005 |
| WO | WO-2005/077487 A1 | 8/2005 |
| WO | WO-2006/093981 A2 | 9/2006 |
| WO | WO-2007/009039 A1 | 1/2007 |
| WO | WO-2007/089662 A2 | 8/2007 |
| WO | WO-2012/153430 A1 | 11/2012 |
| WO | WO-2017/079191 A1 | 5/2017 |
| WO | WO 2017/120113 | 7/2017 |

OTHER PUBLICATIONS

International Preliminary Report on Patentability on PCT/US2018/018724 dated Aug. 27, 2019.
International Search Report on PCT/IB2019/056208 dated Nov. 21, 2019.
International Search Report and Written Opinion issued for PCT/US2018/014401, dated May 15, 2018, 18 pages.
International Search Report and Written Opinion issued for PCT/US2018/018724, dated Apr. 24, 2018, 13 pages.
Akro-Mils, "Nest & Stack Totes," retrieved from http://web.archive.org/web/20150323114331/https://akro-mils.com/produts/types/plastic-storage-containers/nest-stack-totes, 1 page (2015).
First Examination Report for Indian Patent App. No. 202047056950 dated Mar. 24, 2021, 5 pages.
First Examination Report for Indian Patent App. No. 3035/KOLNP/2011, dated Feb. 8, 2019, 7 pages.
First Office Action for Chinese Patent App. No. 201080004417.5, dated May 24, 2013, 13 pages (with translation).
First Office Action for Chinese Patent App. No. 2016800710703 dated Nov. 26, 2019, 29 pages (with translation).
First Office Action for Chinese Patent App. No. 201880012627.5 dated Dec. 12, 2020, 22 pages (with English translation).
First Office Action for Chinese Patent Application No. 201880007980.4 dated Jan. 12, 2021, 15 pages (with English translation).
First Office Action issued for Chinese Patent Application No. CN201880018033.5 dated Dec. 24, 2020, 10 pages.
International Search Report & Written Opinion for PCT/US2010/024765 dated Apr. 7, 2010, 9 pages.
International Search Report and Written Opinion for PCT/US2016/063053, dated Feb. 16, 2017, 8 pages.
International Search Report and Written Opinion for PCT/US2017/021615, dated Jun. 6, 2017, 8 pages.
International Search Report and Written Opinion for PCT/US2017/030386, dated Jul. 26, 2017, 9 pages.
International Search Report and Written Opinion for PCT/US2018/018696, dated Apr. 19, 2018, 8 pages.
Non-Final Office Action on U.S. Appl. No. 16/487,209 dated May 28, 2021.
Office Action for German Patent App. No. 11 2010 001 567.8 dated May 18, 2017, 12 pages (with translation).
Second Office Action for Chinese Patent App. No. 201080004417.5, dated Mar. 5, 2014, 28 pages (with translation).
Office Action issued for Chinese Patent Application No. CN 201880007980.4 dated Jul. 9, 2021, 7 pages.

\* cited by examiner

FIG. 3

EXPANDABLE THREADED ADAPTOR FOR THREADLESS SHELL

CROSS REFERENCE TO RELATED APPLICATIONS

The present application is a national stage of PCT Application No. PCT/US2018/014401, filed Jan. 19, 2018 which claims priority to U.S. Provisional Patent Application No. 62/450,263, filed Jan. 25, 2017. The contents of both applications are incorporated herein by reference in their entirely and for all purposes.

TECHNICAL FIELD

The present application relates generally to fluid filtration systems. More particularly, the present application relates to fuel water separator filter assemblies.

BACKGROUND

Internal combustion engines generally combust a mixture of fuel (e.g., diesel, gasoline, natural gas, etc.) and air. Prior to entering the engine, the fuel is typically passed through a filter element to remove particulate matter (e.g., dust, metal particles, debris, etc.) from the fuel prior to combustion. Similarly, lubricant or lube (e.g., engine oil) provided to the engine may also be passed through a filter element so as to remove particulate matter from the lube before communicating to the engine. The fuel or oil may include water, which may accumulate in the filter and may have to be removed.

Various filter assemblies generally comprise a nut plate positioned on an end of a housing of the filter assembly, with such nut plates providing a mechanism for coupling of a filter head to a first end of the housing of the filter assembly, or coupling of a cover or bowl to a second end of the filter housing. Such nut plates introduce additional parts into the filter assembly and may increase manufacturing complexity and manufacturing cost of such filters. Additionally, the filter is configured for a rotatable and detachable connection to the head and/or bowl, by way of threaded connections. Due to this direct connection, the filter typically must be of a certain type and/or size in order to reliably connect to the head and/or bowl. Consequently, larger shell diameters and increases in wall thickness can prove to be very challenging for the shell suppliers to adapt to, and the alternate design option of roll threading to accommodate these changes is expensive.

SUMMARY

Various embodiments provide for a filter assembly comprising a housing defining an internal volume. The housing comprises a first coupling member formed in a housing first end of the housing. The housing first end is threadless. The filter assembly further comprises a filter head. The filter head comprises a first thread formed on a surface thereof. The filter assembly further comprises an adapter. The adapter comprises a second coupling member formed on an adapter first end of the adapter. The second coupling member engages the first coupling member formed in the housing first end so as to removably couple the adapter and the housing. A second thread is formed on the adapter first end. The second thread engages the first thread formed in the filter head so as to removably couple the adapter and the filter head.

Further embodiments provide for an adapter for a separator filter assembly (such as a fuel water separator filter assembly). The adapter comprises a first coupling member formed on an adapter first end of the adapter body. The first coupling member is configured to engage a second coupling member formed in a housing first end of a housing so as to removably couple the adapter and the housing. A third coupling member is formed on the adapter first end. The third coupling member is configured to engage a fourth coupling member formed in a filter head so as to removably couple the adapter and the filter head.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Embodiments described herein relate generally to a system and method for securing a housing to a filter head without the use of a threaded connection. Generally, the housing has at least one detent (e.g., protrusion) feature formed in a top or first end of the housing, a filter head, having a first thread formed on an internal surface of the filter head; and an adapter configured to be removably coupled to the housing and the filter head.

Embodiments of the filter assembly described herein comprise an adapter that includes an interior facing coupling member for securing a housing and an exterior facing coupling member to a filter head without the use of a threaded connection directly between the housing and the filter head. The adapter can include both male and female coupling members may provide benefits including, for example: (1) allowing direct coupling of a housing to a threaded filter head, thereby allowing any housing to be used in a spin-on filtration system; (2) providing at least one segmented section which allow for flex in the structure of the adapter, thereby easing housing installation in the adapter and allowing for a plurality of coupling members to be used (e.g., snap fit, detent fit, etc.); (3) a secure sealing surface between the filter head and adapter; (4) applying a vertical load on the sealing gaskets without the addition of the torsional twist commonly present with spin on products when the adapter is engaged with the housing; and (5) reducing a manufacturing cost of assembly of the filter assembly by reducing the number of parts included in the filter assembly and allowing flexibility in the usable housing types.

Figure 1A:
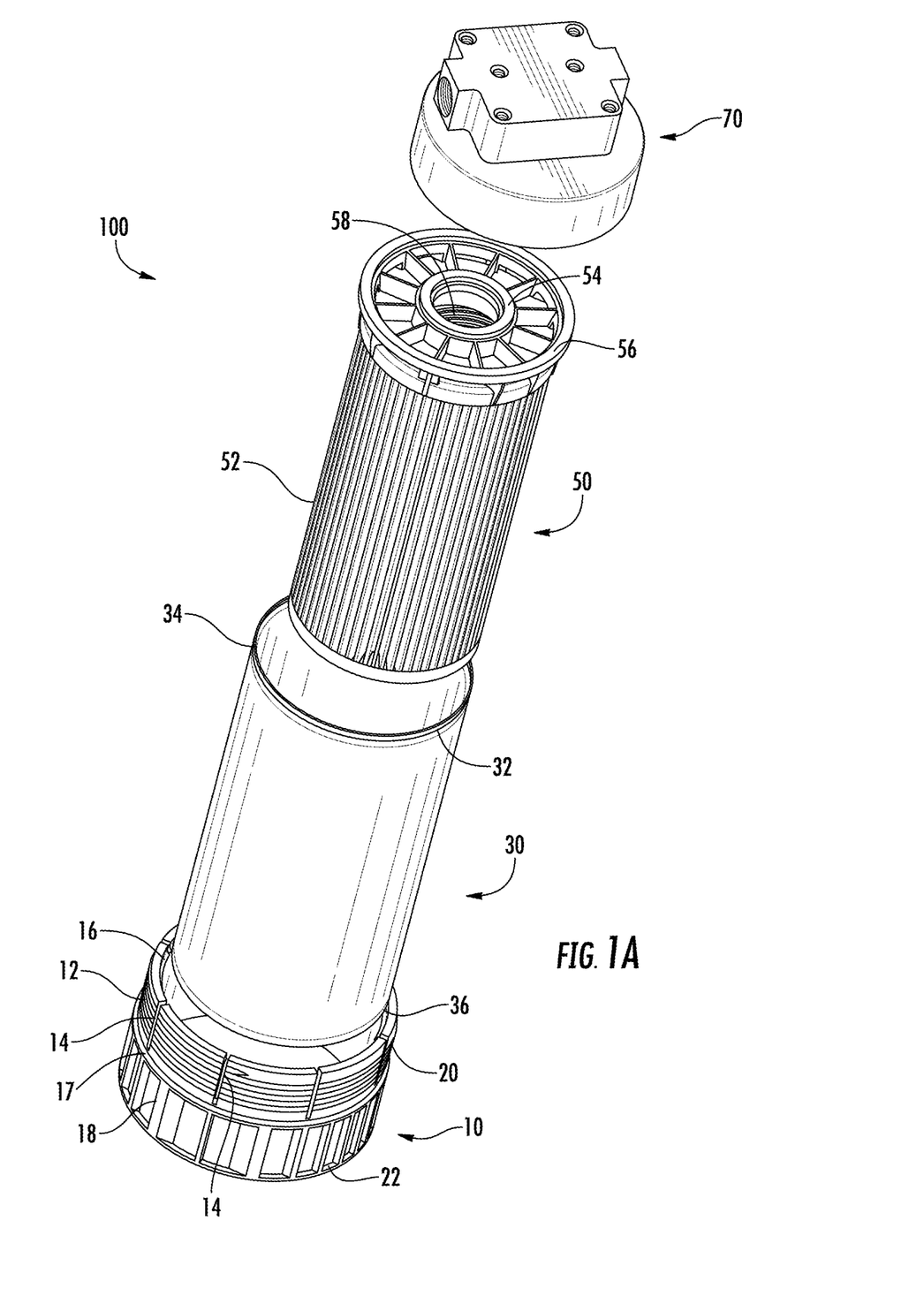
FIG. 1A is an exploded perspective view of a filter assembly, according to an example embodiment.
Figure 1B:
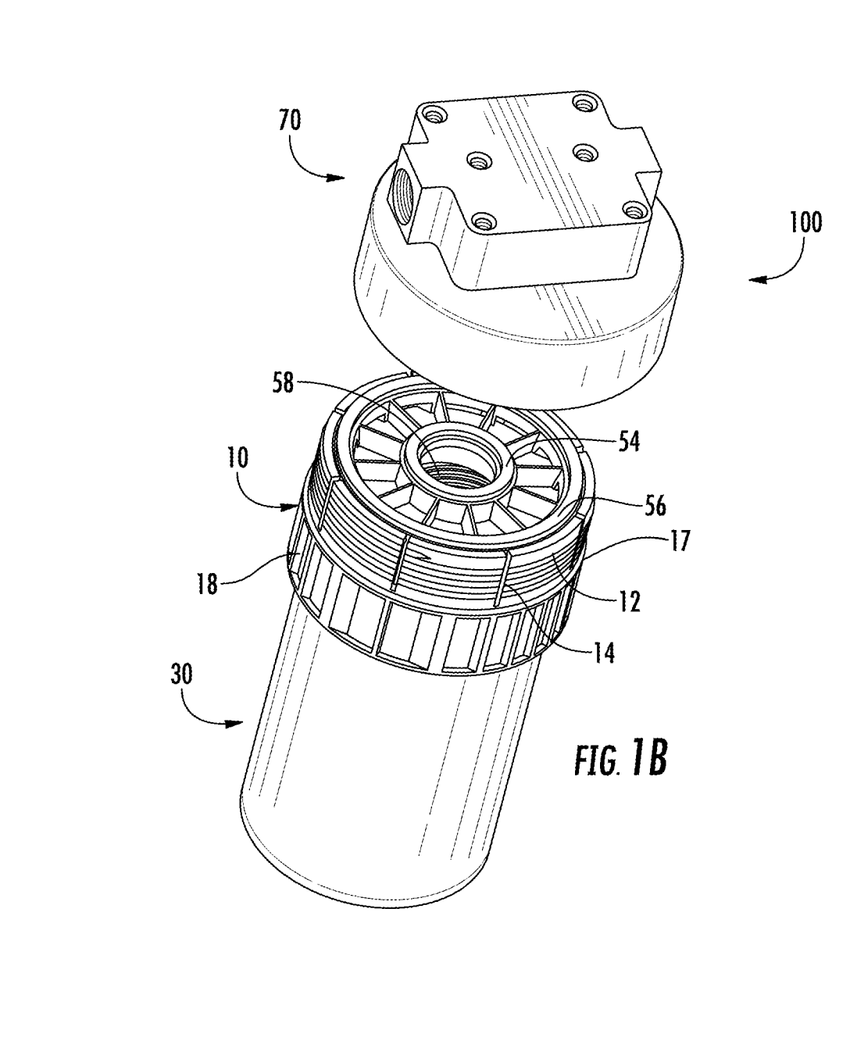
FIG. 1B is an assembled perspective view with a detached filter head of the filter assembly of FIG. 1A.
Figure 1C:
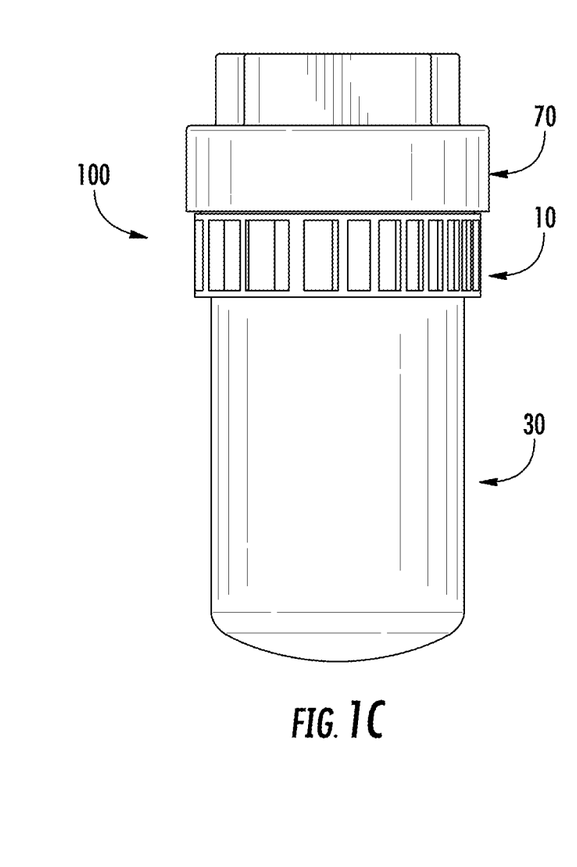
FIG. 1C is a front plan view with an attached filter head of a filter assembly.

FIG. 1A is an exploded perspective view of a filter assembly 100. FIG. 1B is an assembled perspective view of the filter assembly 100 with a detached filter head. FIG. 1C is a front plan view of a filter assembly 100 with an attached filter head. The filter assembly 100 comprises a housing 30, a filter element 50, an adapter 10, and a filter head 70. In the embodiment shown in FIGS. 1A-C, the filter assembly 100 is a fuel filter for the filtration of fuel. However, the filter assembly 100 is not limited to the filtration of fuel and may be used for the filtration of other fluids, such as lube, oil, air, or the like. For example, the filter assembly 100 may be configured to remove water contained in a fuel, such as a diesel fuel, before the fuel is introduced into an engine, such as a diesel engine. In addition, the filter assembly 100 is not limited to a fuel water separator filter and may be alternatively configured to function as different types of filters, including, but not limited to, suction side filters.

The filter head 70 includes a fluid inlet, which allows a fluid to be filtered to flow into the filter element 50, and a fluid outlet, which allows a filtered fluid to flow out of the filter element 50. The filter head 70 includes a filter head base 72 and a filter head sidewall 74 extending from an outer periphery of the filter head base 72. The filter head sidewall 74 extends from an outer periphery of the filter head base 72 towards the housing 30. The filter head 70 has first thread 76 on an inner surface of the filter head sidewall 74. The first thread 76 is structured to removably engage a second thread 12 of the adapter 10, so as to be coupled to a first end 20 of the adapter 10.

The filter element 50 may comprise a spin-on filter that includes a housing 30 and a filter element 50. In some embodiments, the filter element 50 is permanently affixed or installed within the housing 30. The filter element 50 includes a filter media 52 that is configured to filter the fluid. The filter media 52 comprises a porous material having a predetermined pore size and is configured to filter particulate matter from a fluid such as air flowing therethrough. The filter media 52 may comprise pleated media, corrugated media, fluted media, or the like. Disposed within the center of the filter media 52 may be a center tube 58. The center tube 58 may be configured to support the filter media 52 and/or allow the flow of fluid through the filter media 52. The center tube 58 may comprise a plurality of apertures so as to allow the fluid (e.g., air, fuel, oil etc.) to flow into the filter channel after passing through the filter media 52. The center tube 58 may be formed from plastic, metals or any other suitable material.

The filter element 50 includes an inner sealing member 54 and an outer sealing member 56 to provide a radial seal with the filter head 70 and/or the adapter 10. In some embodiments, the seal formed by the inner sealing member 54 and the outer sealing member 56 may comprise a "leak-tight" seal or a "substantially" leak-tight seal. As used herein, the term "leak-tight" is understood to encompass both a hermetic seal (i.e., a seal that is gas-impervious) as well as a seal that is liquid-impervious. The term "substantially" when used in connection with "leak-tight" is intended to convey that, while total fluid imperviousness is desirable, some minimal leakage due to manufacturing tolerances, or other practical considerations (such as, for example, the pressure applied to the seal and/or within the fluid), can occur even in a "substantially leak-tight" seal. In some arrangements, one or both of the inner sealing member 54 and the outer sealing member 56 may comprise O-rings.

The housing 30 defines an internal volume within which the filter element 50 is positioned. The housing 30 may be formed from a strong and rigid material, for example plastics (e.g., polypropylene, high density polyethylene, polyvinyl chloride, etc.), metals (e.g., aluminum, stainless steel, etc.), or any other suitable material. In particular embodiments, the housing 30 may comprise a cylindrical housing having generally a circular cross-sectional. In other embodiments, the housing 30 may have any suitable shape, for example square, rectangular, polygonal, etc.

The housing 30 comprises a housing first end 34 and a housing second end 36. The housing first end 34 comprises first coupling member 32 on an outer surface thereof. In some arrangements, the first coupling member 32 comprises a female end to a male-female coupling member pair, configured to receive a corresponding male coupling member (e.g., the second coupling member 16) of the adapter. As used herein, "housing first end" 34 is intended to refer to the area that comprises about twenty percent of the axial distance starting from the boundary that forms the top of the housing 30 member towards the boundary that forms the bottom of the housing 30. As used herein, "housing second end" 36 is intended to refer to the area that comprises about twenty percent of the axial distance starting from the boundary that corresponds to the bottom of the housing 30 member towards the boundary that corresponds to the top of the housing 30.

As shown in FIG. 1A, the first coupling member 32 comprises a detent element. In some arrangements, the first coupling member 32 is stamped into the housing 30. In other arrangements, the first coupling member 32 may be molded or otherwise formed into a sidewall of the housing 30. The first coupling member 32 is structured to removably engage a second coupling member 16 of the adapter 10, so as to be coupled to the first end 20 of the adapter 10.

The adapter 10 is configured to couple the housing 30 to the filter head 70 and filter element 50. The adapter 10 comprises the second thread 12 disposed externally on the first end 20, at least one segmented section 14 on the first end 20, second coupling member 16 disposed internally on the first end 20, an outer flange 17 extending radially outward from the adaptor 10, and a plurality of indentations 18 disposed externally on a second end 22. The outer flange 17 is interposed between the second thread 12 and the plurality of indentations 18. In some arrangements, the second coupling member 16 comprises a male coupling member of a male-female coupling member pair, configured to receive a corresponding female coupling member (e.g., the first coupling member 32) of the housing.

Generally, the adapter 10 first receives a housing 30, whereby the adapter 10 is positioned circumferentially around the housing first end 34 of the housing. The filter head 70 receives the adapter 10, whereby the filter head 70 is circumferentially around the first end 20 of the adapter 10. Upon installation of the adapter 10 into the filter head 70, the filter head 70, adapter 10, housing 30, and filter element 50 are all removably coupled and form a "leak-tight" seal in various locations to facilitate the intake, filtering, and outflow of a fluid. As will be appreciated, the adapter 10 can be re-used with multiple different housings 30 (e.g., during filter servicing, the adapter 10 can be removed from a used housing 30, the used housing 30 is discarded, and the adapter 10 reattached to a new housing 30 having the mating member to the coupling member 32). The adapter 10 may be formed from a strong and rigid material, for example plastics (e.g., polypropylene, high density polyethylene, polyvinyl chloride, etc.), metals (e.g., aluminum, stainless steel, etc.), or any other suitable material The at least one segmented section 14 is structured to allow flex in the first end 20 of the adapter 10 to facilitate coupling with the housing 30. The segmented section 14 allows for the adapter 10 to be inserted onto the housing 30 and provide the second coupling member 16 of the adapter 10 to the first coupling member 32 of the housing 30. The segmented section 14 may be radially disposed on the first end of the adapter 10. In some arrangements, the segmented section 14 includes eight segmented sections to provide greater flex and ease of installation over the housing 30

The second coupling member 16 comprises an internally facing coupling member disposed on the first end 20 (e.g., on an internal wall) and structured to couple with the first coupling member 32 of the housing 30. In addition, the second coupling member 16 extends radially inward. The second coupling member 16 may be formed during a deep draw machining process used to form the adapter 10. In some arrangements, the second coupling member 16 includes a male detent element. The connection between the adapter 10 and the housing 30, however, is not particularly limited to a detent element and may be any other appropriate detachable connections, such as a snap-fit connection or the like. As will be appreciated, when the expandable adapter 10 attaches to the housing 30 a vertical load is applied on the inner sealing member 54 and the outer sealing member 56 without the addition of the torsional twist commonly present—and required—with spin-on filter assemblies.

The second thread 12 comprises an externally facing thread disposed on the first end 20 (e.g., on an outer wall) and structured to engage with the first thread 76 of the filter head 70. In addition, the second thread 12 extends radially outward. In some arrangements, the threaded design is that of a buttress design, whereby the threads are positivity fixed by the threads disposed on the filter head 70. In those arrangements, there is no possibility of expansion of the threads and/or the adapter 10 that would loosen or reduce the force applied to the sealing members (e.g., gaskets). The second thread 12 may be formed during a deep draw machining process used to form the adapter 10. In some arrangements, the second thread 12 includes two threads per turn. The connection between the adapter 10 and the filter head 70, however, is not particularly limited to a threaded connection and may be any other appropriate detachable connections, such as a snap-fit connection or the like. The second thread 12 is separated from the plurality of indentations 18 by the outer flange 17.

A plurality of indentations 18 or depressions may be formed on an outer surface of the adapter second end 22. For example, the plurality of indentations 18 may comprise axial indentations defined circumferentially about the adapter second end 22. The plurality of indentations 18 may be positioned with any suitable spacing between each adjacent indentation (i.e., any positioned at any suitable pitch). The plurality of indentations 18 may serve to facilitate gripping of the housing 30 for coupling and/or uncoupling the housing, for example to a filter head 70.

Referring to FIG. 1B, an assembled perspective view with a detached filter head 70 of the filter assembly 100 of FIG. 1A is shown. To install the adapter 10, the filter element 50 is first disposed in the housing 30 and secured within the housing, for example, through threaded, welded, or snap-fit connections. The housing 30—now comprising the filter element 50 in the internal volume of the housing 30—is then inserted into the adapter 10 such that the second coupling member 16 of the adapter 10 is disposed in the first coupling member 32 of the housing 30. The segmented section 14 of the adapter 10 allows for flex and aids in easing the installation of the adapter 10 over the housing 30. In some embodiments, the adapter 10 may be smaller (e.g. smaller in radius) than the housing 30. In those embodiments, the installation may be reversed, such that the adapter 10 is inserted into the housing 30 such that the second coupling member 16 of the adapter 10 is disposed in the first coupling member 32 of the housing 30.

Referring to FIG. 1C, an assembled front plan view of the filter assembly 100 of FIG. 1A is shown. To engage the adapter 10—now removably coupled to the filter element 50 and the housing 30—the adapter 10 is engaged with the filter head 70. The installation includes rotating the adapter 10 such that the first thread 76 of the filter head 70 is rotationally coupled with the second thread 12 of the adapter 10. As will be appreciated, the rotation of the adapter 10 into the filter head 70, compresses the segmented section 14 and the first end 20 of the adapter 10, thereby tightening the coupling of the second coupling member 16 of the adapter 10 disposed in the first coupling member 32 of the housing 30. Upon installation of the adapter 10 in the filter head 70, the various features coupled together are substantially flush with each other and can comprise a leak-tight" seal. As will be appreciated, when the adapter 10 is attached to the filter head 70, a vertical load is applied on the inner sealing member 54 and the outer sealing member 56 without the addition of the torsional twist. In some embodiments, the adapter 10 is larger (e.g., larger in radius) than the filter head 70. In those embodiments, the installation may be different, such that the adapter 10 is raised to the filter head 70, causing the filter head 70 be inserted into the adapter 10, and the adapter 10 is rotated such that the first thread 76 of the filter head 70 is rotationally coupled with the second thread 12 of the adapter 10.

Figure 2:
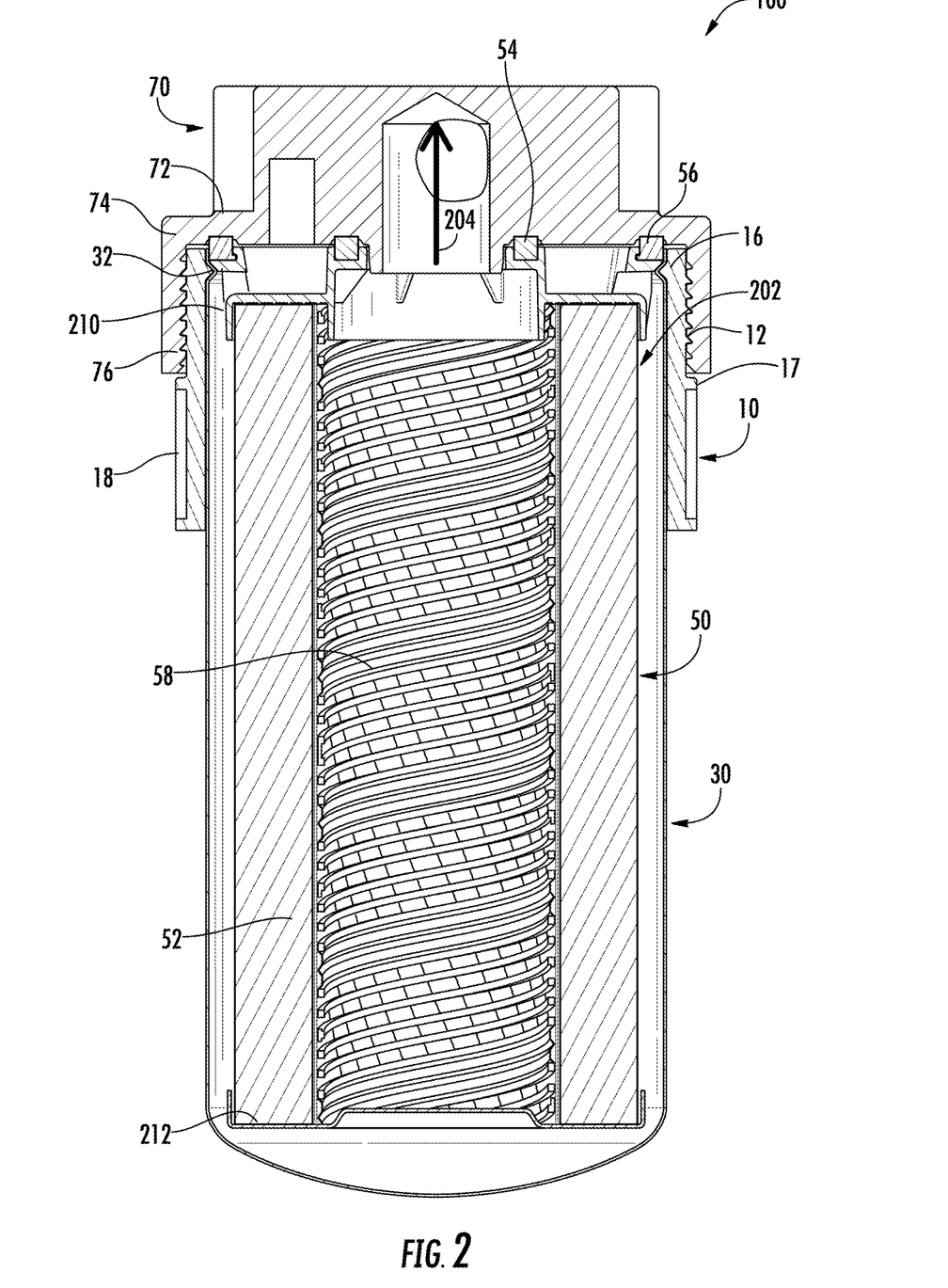
FIG. 2 is a cross-sectional view of the assembled filter assembly of FIG. 1C.

Referring to FIG. 2, a cross-sectional view of the assembled filter assembly of FIG. 1C is shown. As shown, the various features coupled together are substantially flush with each other and comprise a leak-tight" seal. For example, the filter head 70 and adapter 10 are substantially flush via the thread coupling 12, 76 (e.g., male-female thread coupling). The adapter 10 and the housing 30 are substantially flush via the coupling members connection. The inner sealing member 54 and the outer sealing member 56 of the filter element 50 are sealably connected and flush with the filter head 70. The filter element 50 is securely disposed in the housing 30 through a first (e.g. top) end cap 210 and a second (e.g., bottom) end cap 212. In operation, the fluid flows into the filter head 70 through an inlet (not shown) and flows into 202 the housing 30. The fluid is filtered by the filter media 52 and travels radially through the filter media 52 into the center tube 58. The filtered fluid travels axially through the center tube 58 and flows out 204 of an outlet (not shown) in the filter head 70.

Figure 3:
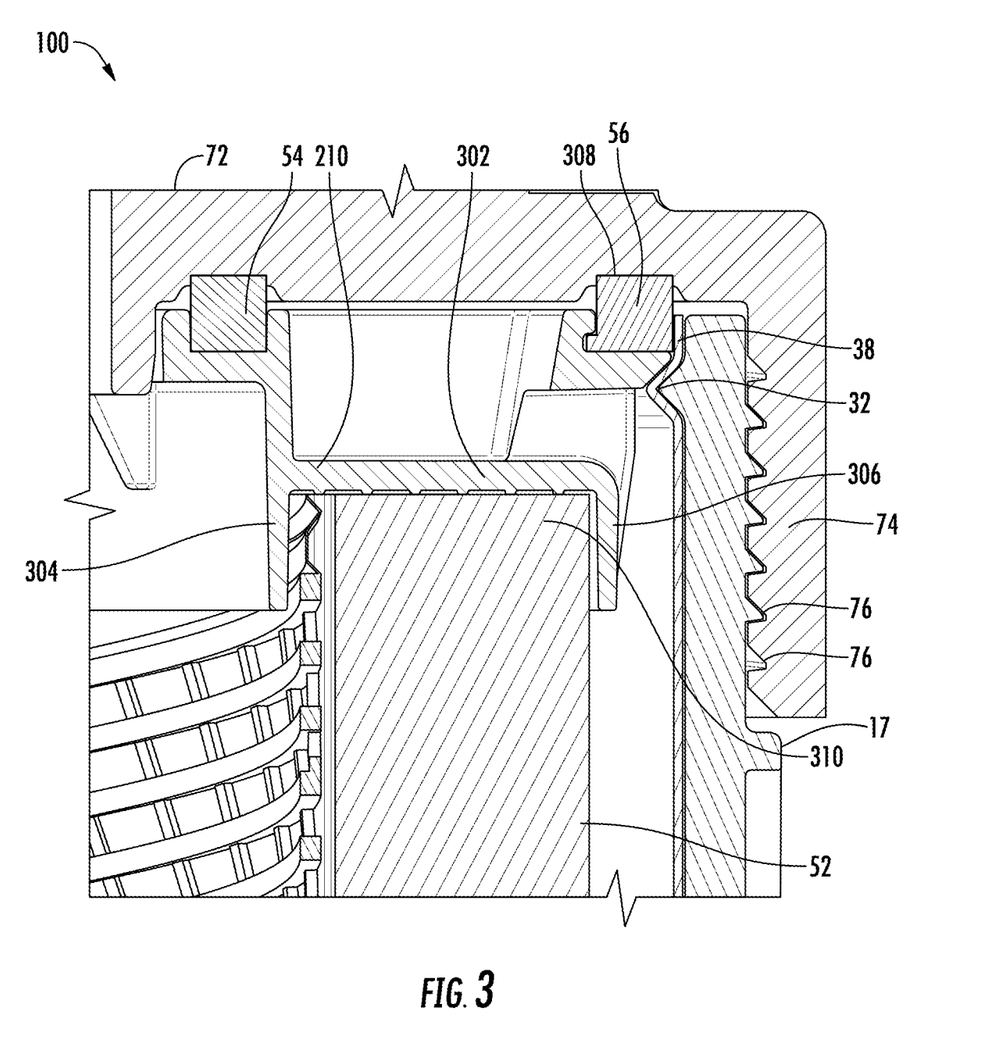
FIG. 3 is a partial cross-sectional exploded view of a section of the filter assembly of FIG. 2.

Referring to FIG. 3, a partial cross-sectional exploded view of a section of the filter assembly of FIG. 2 is shown. FIG. 3 provides an exploded view of the filter head 70 and adapter 10 being substantially flush via the thread coupling 12, 76; the adapter 10 and the housing 30 being substantially flush via the coupling members connection 16, 32; the inner sealing member 54 and the outer sealing member 56 of the filter element 50 being sealably connected and flush with the filter head 70; and the filter element 50 being securely disposed in the housing 30 through a first end cap 210 and a second end cap 212.

Expanding on the first end cap 210, the first end cap 210 is coupled to the top end of the filter media 52. The first end cap 210 may be formed from any suitable material, for example plastics, metals, rubber, reinforced rubber, polymers etc. The first end cap 210 may have a cross-section corresponding to the cross-section of the housing 30. The first end cap 210 comprises a base 302 and a first axial sidewall 304 extending from the base 302 towards the filter media 52. The first axial sidewall 304 is positioned inwardly from an outer edge of the base 302 of first end cap 210. For example the first axial sidewall 304 may comprise a circular sidewall extending from the base 302, and define a fluid outlet about the longitudinal axis of the filter assembly 100. The center tube 58 may be positioned in the outlet so as to provide an outlet conduit for the filtered fluid to be expelled from the housing 30.

The first end cap 210 further comprises a second axial sidewall 306 extending from the outer edge of the base 302 towards the filter media 52. The second axial sidewall 306 is spaced apart from the first axial sidewall 304. A filter media first end 310 may be positioned between the first axial sidewall 304 and the second axial sidewall 306. For example, the second axial sidewall 306 may be concentric with the first axial sidewall 304 and separated therefrom so that a circumferential space is defined between the first axial sidewall 304 and the second axial sidewall 306. The filter media first end 310 may be positioned in the space between the first axial sidewall 304 and the second axial sidewall 306. In some embodiments, the filter media first end 310 may be fixedly coupled to the base 302 of the first end cap 210, for example via an adhesive, heat bonded or fusion bonded to the first end cap 210. In some arrangements, the first end cap 210 includes a fluid inlet defined in the base 302 adjacent to the second axial sidewall 306 and a fluid outlet defined within the first axial sidewall 304.

Expanding on the outer sealing member 56, the outer sealing member 56 is positioned in a U-shaped channel between an outer surface of the first end cap flange, and an inner surface of the housing first end 34. The outer sealing member 56 forms a seal between the housing 30 and the first end cap 210, for example a leak-tight seal. The outer sealing member 56 may comprise a machine cut gasket having any suitable cross-sectional, for example rectangular cross-sectional or a circular cross-sectional (e.g., an O-ring). In some arrangements, the outer sealing member 56 comprises a square cut gasket having a rectangular or square cross-sectional shape.

The filter head 70 may further comprise a circumferential groove 308 defined on the filter head base 72, for example on a first surface of the filter head base 72 of the filter head 70 facing the first end cap 210. The circumferential groove 308 is structured to receive at least a portion of the outer sealing member 56, such that the outer sealing member 56 may seal each of the housing 30, the first end cap 210, adapter 10, and the filter head 70. The filter head sidewall 74 may also exert a radial force onto the housing first end 34 of the housing 30 which may push the housing flange towards the outer sealing member 56 and the first end cap 210, thereby enhancing the sealing provided by the outer sealing member 56.

Moreover, the housing 30 may also comprise a housing flange 38 positioned circumferentially about an outer periphery of the housing ledge. The housing flange 38 extends axially away from the first coupling member 32 of the housing 30 parallel to the longitudinal axis such that the housing ledge and the housing flange 38 define an L-shaped groove. At least a portion of the outer sealing member 56 is positioned within the L-shaped groove.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, various parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various example embodiments without departing from the scope of the concepts presented herein.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter assembly, comprising:
　a housing defining an internal volume, the housing comprising a first coupling member formed on an outer surface on a housing first end of the housing, the housing first end being threadless;
　a filter head comprising a first thread formed on a surface thereof; and
　an adapter comprising:
　　a second coupling member formed on an internal surface on an adapter first end of the adapter, the second coupling member engaging the first coupling member formed in the housing first end so as to removably couple the adapter and the housing;

a second thread formed on an external surface on the adapter first end, the second thread engaging the first thread formed in the filter head so as to removably couple the adapter and the filter head; and a segmented section formed on the adapter first end, the segmented section including the second coupling member, the segmented section allowing for flex in the adapter first end to expand to a larger diameter to receive the housing, wherein rotation of the adapter into the filter head compresses the segmented section into the housing.

2. The filter assembly of claim 1, wherein the first thread is formed on an internal surface of the filter head.

3. The filter assembly of claim 1, wherein the second coupling member comprises one of a protrusion and a detent, and wherein the first coupling member comprises the other of the protrusion and the detent.

4. The filter assembly of claim 1, wherein the second thread is a buttress thread.

5. The filter assembly of claim 1, further comprising:
a filter element positioned within the internal volume of the housing, the filter element comprising:
filter media; and
a first end cap coupled to a filter media first end of the filter media, the first end cap comprising:
a base, and
a first end cap flange positioned about a periphery of the base, the first end cap flange extending from the base away from the filter element; and
a first end sealing member positioned between an outer surface of the first end cap flange and an inner surface of the housing first end, the first end sealing member forming a seal between the housing and the first end cap.

6. The filter assembly of claim 1, wherein the adapter is permanently connected to the housing.

7. An adapter for a separator filter assembly, comprising:
an adapter body;
a first coupling member formed on an adapter first end of the adapter body, the first coupling member configured to engage a second coupling member formed on an outer surface of a housing first end of a housing so as to removably couple the adapter and the housing;
a third coupling member formed on an external surface of the adapter first end, the third coupling member configured to engage a fourth coupling member formed in a filter head so as to removably couple the adapter and the filter head; and
a plurality of segmented sections extending around the adapter first end, the plurality of segmented sections allowing for flex in the adapter to receive the housing, the plurality of segmented sections comprising a portion of the first coupling member and a portion of the third coupling member.

8. The adapter of claim 7, wherein the first coupling member formed on the adapter first end comprises a protrusion that is formed on an internal surface on the adapter first end.

9. The adapter of claim 7, wherein the third coupling member and the fourth coupling member each comprise a threaded coupling member.

10. The adapter of claim 7, wherein the third coupling member formed on the adapter first end is disposed radially along an outside circumferential surface of the adapter.

11. The adapter of claim 7, wherein the first coupling member formed on the adapter first end is disposed radially along an inside circumferential surface of the adapter.

12. The adapter of claim 7, further comprising:
a plurality of indentations formed on an outer surface of the adapter, the plurality of indentions being axial indentations defined circumferentially about adapter, the plurality of indentations facilitating gripping for coupling and/or uncoupling of the adapter by a user.

13. The adapter of claim 7, further comprising an outer flange extending circumferentially along an outside surface of the adapter, the third coupling member separated from a plurality of indentations by the outer flange.

14. The filter assembly of claim 1, wherein a portion of the second coupling member extends radially inward from the segmented section.

15. The filter assembly of claim 1, wherein a portion of the second thread extends radially outward from the segmented section.

16. The filter assembly of claim 5, wherein the filter element further comprises an inner sealing member coupled to the first end cap and positioned radially inward from the first end sealing member.

17. The filter assembly of claim 16, wherein the first end sealing member and the inner sealing member are engaged with the filter head so as to form a sealing engagement.

18. The filter assembly of claim 17, wherein the filter head further comprises a circumferential groove structured to receive at least a portion of the first end sealing member such that the first end sealing member forms a sealing engagement with the circumferential groove.

19. The adapter of claim 7, wherein rotation of the adapter into the filter head compresses the plurality of segmented sections into the housing.

* * * * *